United States Patent [19]

Schiff

[11] Patent Number: 4,616,252

[45] Date of Patent: Oct. 7, 1986

[54] SAMPLED COLOR DIFFERENCE SIGNAL PROCESSING SYSTEM HAVING A QUADRATURE DISTORTION REDUCTION DIFFERENTIATOR

[75] Inventor: Leonard N. Schiff, Lawrence Township, Mercer County, N.J.

[73] Assignee: RCA Corporation, Princeton, N.J.

[21] Appl. No.: 631,073

[22] Filed: Jul. 16, 1984

[51] Int. Cl.[4] ............................................. H04N 11/14
[52] U.S. Cl. .................................................... 358/23
[58] Field of Search ...................... 358/23; 375/39, 40, 375/102, 103

[56] References Cited

U.S. PATENT DOCUMENTS

| | | | |
|---|---|---|---|
| 2,795,643 | 6/1957 | Lockhart | 358/16 |
| 2,799,723 | 7/1957 | Torre et al. | 358/38 |
| 2,844,645 | 7/1958 | Fredendall | 358/38 |
| 3,029,400 | 4/1962 | Nelson | 333/77 |
| 4,288,811 | 9/1981 | Naimpally | 358/31 |
| 4,306,307 | 12/1981 | Levy et al. | 375/39 |
| 4,434,438 | 2/1984 | Rzeszewski | 358/36 |
| 4,502,074 | 2/1985 | Reitmeier | 358/23 |

FOREIGN PATENT DOCUMENTS

| | | |
|---|---|---|
| 2205839 | 8/1973 | Fed. Rep. of Germany . |
| 1188612 | 4/1970 | United Kingdom . |
| 2110047A | 6/1983 | United Kingdom . |

OTHER PUBLICATIONS

Stein, S. Schwartz, M. S. & Bennet, W. R., *Communications Systems and Techniques*, McGraw Hill, 1966, pp. 29-38.

Bailey, W. F. & Hirsch, C. J., "Quadrature Crosstalk", Proceedings of the IRE, Jan. 1954, pp. 84-90.

*Primary Examiner*—John W. Shepperd
*Attorney, Agent, or Firm*—E. M. Whitacre; P. J. Rasmussen; K. N. Nigon

[57] ABSTRACT

A system is described in which the audio subcarrier components are attenuated relative to the other components of composite television signals by an inexpensive IF filter. This filter incidentally produces quadrature distortion between the two color difference signal components of the composite television signals. The disclosed invention includes a differentiator, responsive to at least one of the color difference signals, that derives signals proportional to the quadrature distortion components present in the other color difference signal. These distortion components are then subtracted from the other color difference signal to produce a signal that is substantially free of quadrature distortion. The differentiator and subtracter are advantageously realized in the form of a simple FIR filter.

7 Claims, 6 Drawing Figures

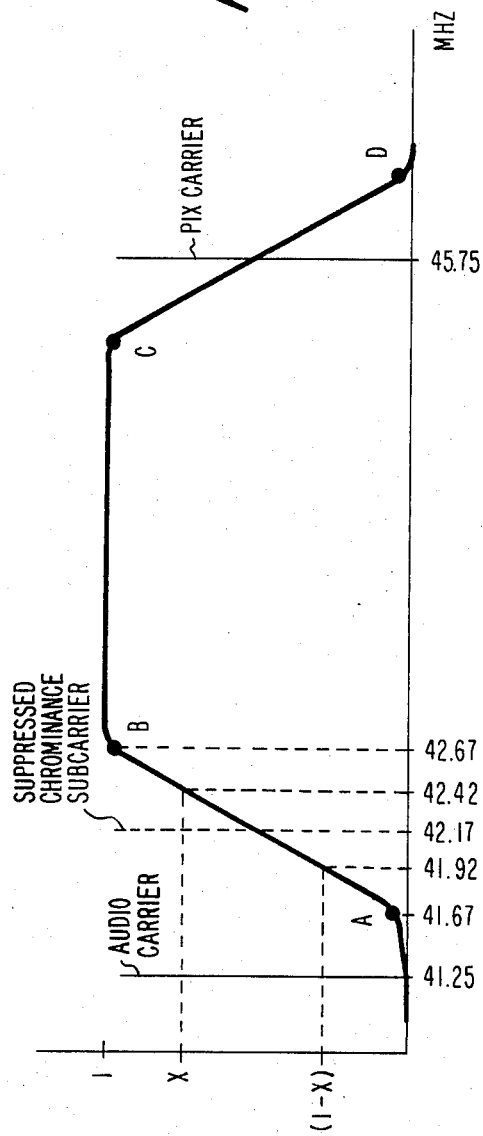
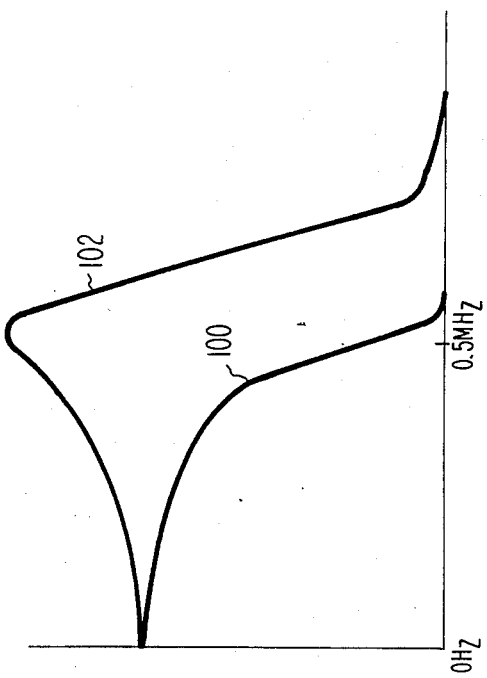

SAMPLED COLOR DIFFERENCE SIGNAL PROCESSING SYSTEM HAVING A QUADRATURE DISTORTION REDUCTION DIFFERENTIATOR

The present invention relates generally to video signal demodulating apparatus and particularly to apparatus for demodulating the color difference signal components of composite television signals.

NTSC composite television signals include three component signals, luminance, chrominance and sound. The luminance signal amplitude modulates a picture carrier signal to produce an upper sideband that is approximately 4 MHz wide and a lower sideband that is approximately 750 KHz wide. The chrominance signal amplitude and phase modulates a suppressed chrominance subcarrier signal. This subcarrier signal is at a frequency 3.58 MHz greater than the picture carrier and so, is within the frequency spectrum of the upper luminance sideband. The chrominance signal consists of two quadrature phase related components, the I and Q color difference signals. The Q component of the modulated chrominance subcarrier comprises two sidebands having equally wide frequency spectra (e.g. 500 KHz). The I component of the modulated subcarrier also consists of two sidebands. However, these sidebands are asymmetrical; their frequency spectra have different widths (e.g. 500 KHz and 1.2 MHz). Consequently, the demodulated I and Q color difference signals may have different bandwidths. The sound signal frequency modulates a subcarrier signal that has a frequency 4.5 MHz greater than the picture carrier, and so is outside of the frequency spectra of the modulated luminance and chrominance signals.

The close relationship among these modulated component signals makes their demodulation difficult. Two problems are particularly relevant to the present invention: the elimination of interference in the luminance signal resulting from the beat between the sound and chrominance subcarriers and the recovery of I color difference signals over their full 1.2 MHz frequency spectrum.

In the NTSC system, the difference between the frequencies of the chrominance and sound carriers is 920 KHz. The beat of these two frequencies in the baseband demodulated composite video signal produces interference in the luminance signal that appears as a fine herringbone pattern in the reproduced image. To minimize the magnitude of this interference, it is desirable to attenuate the modulated sound subcarrier prior to video amplification. This subcarrier is most commonly attenuated by using an intermediate frequency (IF) amplifier with a frequency characteristic having the sound subcarrier frequency in its roll-off region or in its stop band. This filter is usually supplemented by band rejection or trap filters, tuned to the sound carrier frequency, in the video signal processing circuitry.

This method of attenuation may cause problems if it affects the modulated chrominance signal. When the IF amplifier has a frequency characteristic that places part of the modulated chrominance signal in its pass band and part in the roll-off region, it induces quadrature distortion between the two color difference signal components of the modulated chrominance signal. This distortion results from analogous frequency components of the two sidebands of each of the color difference signals having different amplitude values. A bandpass filter in the chrominance processing circuitry which attenuates the sidebands that were passed by the IF amplifier, so their frequency spectra match the ones that were rolled off, will remove most of the quadrature distortion components. However, this type of filter attenuates the high frequency chrominance components, making it difficult to recover the full I color difference signal.

An IF amplifier that has a sharp roll-off in its frequency characteristic so that it passes the full chrominance signal but stops the audio carrier would not produce quadrature distortion in the chrominance signal. However, it is expensive to design and produce a filter of this type which does not cause undesirable phase shifting, and so color hue errors, in the chrominance signal components.

Even if the chrominance components of a composite television signal are recovered in their entirety and without quadrature distortion or hue errors, it is difficult to recover I color difference signals that have a uniform range of amplitude values over the full frequency spectrum of the I signal. Because of the asymmetrical sideband modulation of the chrominance subcarrier by the I signal, the demodulated high frequency components (from 500 KHz to 1.2 MHz) have amplitude ranges only half as large as those of the low frequency components (from 0 Hz to 500 KHz). To obtain I signals having the same range of amplitude values for both the low and high frequency components, the demodulator must either be preceeded by a filter which modifies the frequency spectrum of the modulated signal to reject the narrower sideband or followed by a filter to equalize the response of the demodulated signal over the 1.2 MHz frequency spectrum. Both of these techniques require extra filtration and so, add to the cost of the television receiver.

Accordingly, it is an object of this invention to provide a color difference signal processing system which uses an inexpensive filter to attenuate the modulated sound signal components of composite television signals and yet provides color difference signals having minimal quadrature distortion.

It is a further object of this invention to use the aforementioned filter to obtain I color difference signals having a uniform range of amplitude values over the full I signal frequency spectrum.

SUMMARY OF THE INVENTION

A color difference signal processing system in accordance with the present invention is embodied in a system having a first filter with a frequency characteristic which has a roll-off that is oddly symmetric about the frequency of the chrominance subcarrier signal and that is approximately coextensive with the band of frequencies occupied by the double sideband modulated portions of the color difference signals. As used herein, a roll-off region of the frequency characteristic of a filter is oddly symmetric about a given frequency if the sum of the responses for frequencies equally displaced above and below the given freqency equals the response for frequencies in the pass band. The processing system also includes a second filter, responsive to one of the color difference signal components of the composite television signal for providing a signal representative of distortion components induced into the other color difference signal by the first filter. This distortion signal is combined with the other color difference sigal to produce a signal that is substantially free of quadrature distortion components.

BRIEF DESCRIPTION OF THE DRAWINGS

FIG. 2 is a graph of amplitude versus frequency which illustrates the frequency spectrum of the composite television signals at output terminal MV of IF amplifier 12 in FIG. 1.

FIG. 3 is a graph of amplitude versus frequency which illustrates frequency spectra useful in understanding the operation of the system shown in FIG. 1.

DETAILED DESCRIPTION

Figure 1:
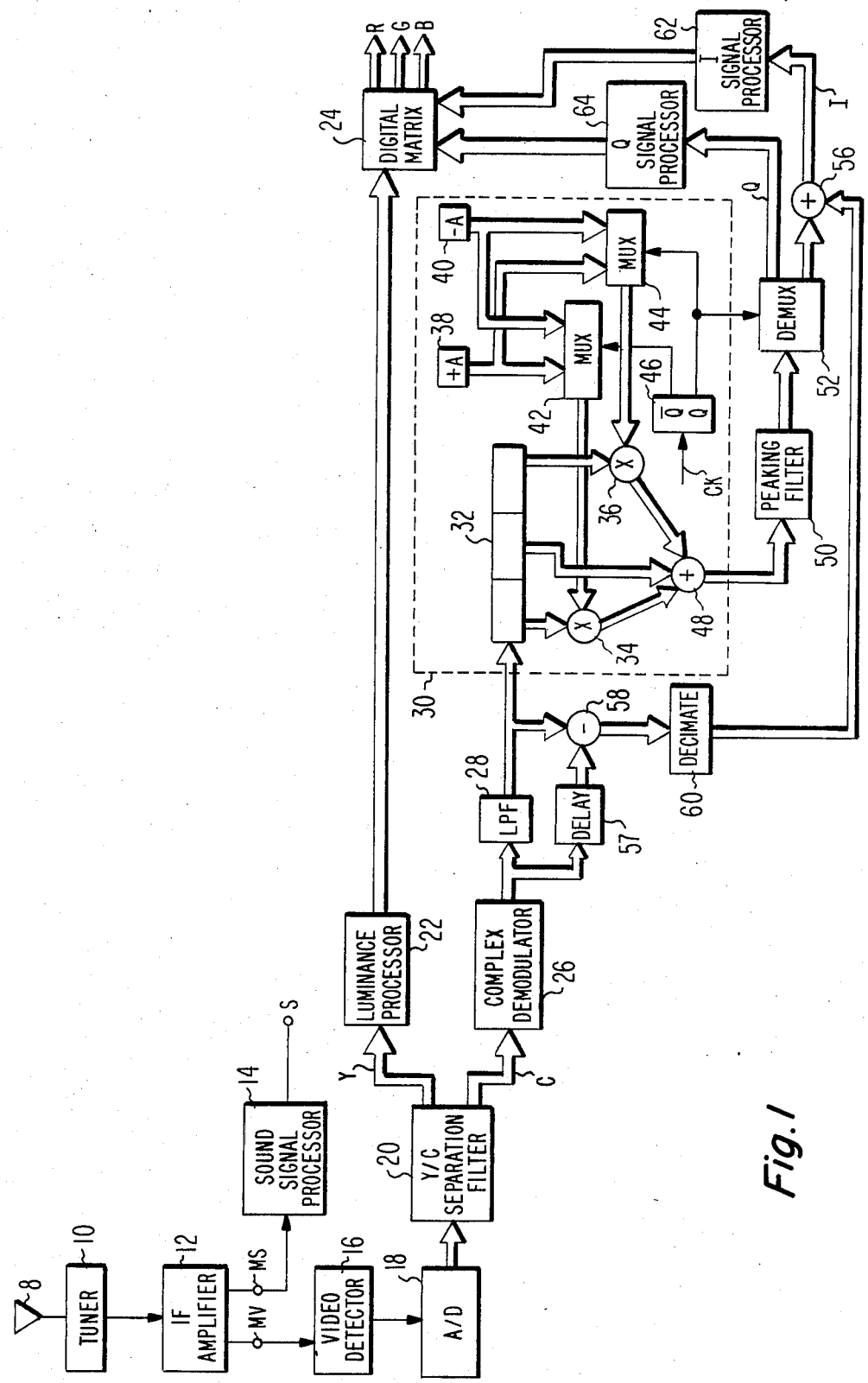
FIG. 1 is a block diagram of a color difference signal processing system in accordance with the present invention.

The following terminology is adopted to aid explanation of the present invention. The frequency characteristic of a filter has three parts: the pass band, the transition band and the stop band. The pass band is the band of frequencies passed by the filter with little or no attenuation. The stop band or bands are the ranges of frequencies that are maximally attenuated by the filter. Between the pass band and a stop band is a band of frequencies having levels of attenuation that vary with variation in frequency; this is the roll-off region or transition band of the filter. Viewing the graph in FIG. 2 as a frequency characteristic, the portions of the curve to the left of point A and to the right of point D are the stop bands. The portion between points B and C is the pass band. Accordingly, the portions between points A and B and between points C and D are the transition bands or roll-off regions of the characteristic.

The transition band of the frequency characteristic between points A and B is oddly symmetric about the frequency of the suppressed chrominance subcarrier. The result of this odd symmetry, as stated above, is that the sum of the amplitude values for frequencies equally displaced above and below the point of symmetry equals the amplitude value for frequencies in the pass band. For example, if the amplitude value on the response curve shown in FIG. 2 for 42.42 MHz (250 KHz greater than the subcarrier frequency) is X, then the amplitude for 41.92 MHz (250 KHz less than the subcarrier frequency) is 1-X.

The operational details of the present invention are most easily explained in the context of a mathematical model. In the equations that follow C(t) represents the chrominance signal. The low frequency double-sideband modulating I and Q color difference signal components are represented as $I_L$ and $Q_L$ respectively, and the high frequency single-sideband modulating I signal component is represented as $I_H(t)$. As only one sideband exists for these high frequency I signal components, quadrature distortion terms, in the form of Hilbert transformed high frequency I signal components ($\hat{I}_H(t)$) contaminate the modulated Q signal at frequencies outside of the frequency spectrum of the Q signal. The equations below use the first and second derivative of various ones of the signals listed above. The first derivative of the low frequency I signal component is designated, for example, $I_L'(t)$, and the second derivative is designated $I_L''(t)$.

The suppressed carrier modulated by these signals can be represented as $\cos \omega_{sc} t$. The textbook equation:

$$C(t) = (I_L(t) + \tfrac{1}{2} I_H(t)) \cos \omega_{sc} t + (Q_L(t) + \tfrac{1}{2} \hat{I}_H(t)) \sin \omega_{sc} T \quad (1)$$

describes the chrominance component of a composite television signal. If the signal in equation 1 is applied to a filter which has a linear transition band that is oddly symmetric about the chrominance subcarrier frequency and coextensive with the frequency spectrum of the double-sideband modulated components of the color difference signals, chrominance signals, $C_f(t)$, are obtained. The amplitude of the low frequency components of each of the color difference signals that make up these chrominance signals is reduced by one-half by the action of this filter. Additionally, each of the two color difference signal components of $C_f(t)$ contains quadrature distortion components proportional to the first derivative of the low frequency components of the other color difference signal component. The equation that describes this signal is known in the art as:

$$C_f(t) = \tfrac{1}{2}(I_L(t) + (1/\omega_m)Q_L'(t) + I_H(t)) \cos \omega_{sc} t + \tfrac{1}{2}(Q_L(t) - ((1/\omega_m)I_L'(t) - \hat{I}_H(t))) \sin \omega_{sc} t. \quad (2)$$

In this equation, $\omega_m$ is $2\pi$ times a frequency ($f_m$) equal to one-half of the width of the transition band of the filter, or $2\pi$ (500 KHz). Applying the signal in equation 2 to a low pass filter which removes the high frequency I signal components, and demodulating the sin and cos terms separately yields low frequency I and Q color difference signals each containing a quadrature distortion component proportional to the first derivative of the other. The equations that describe these two components, $I_{DL}$ and $Q_{DL}$, are:

$$I_{DL}(t) = \tfrac{1}{2}(I_L(t) + (1/\omega_m)Q_L'(t)) \quad (3)$$

$$Q_{DL}(t) = \tfrac{1}{2}(Q_L(t) - (1/\omega_m)I_L'(t)). \quad (4)$$

The quadrature distortion in each of the color difference signals can be approximated by the scaled derivative of the other color difference signal. When the signal described by equation 3 is passed through a differentiator, scaled by a factor of $1/\omega_m$ and added to the signal described by equation 4, a resultant Q color difference signal, $Q_R$, is obtained that is described by the equation $$Q_R(t) = \tfrac{1}{2}(Q_L(t) + (1/\omega_m^2)Q_L''(t)). \quad (5)$$

Similarly, when the signal described by equation 4 is passed through a differentiator, scaled by a factor of $1/\omega_m$ and subtracted from the signal described by equation 3, the resultant I color difference signal, $I_R$, is described by the equation:

$$I_R(t) = \tfrac{1}{2}(I_L(t) + (1/\omega_m^2)I_L''(t)). \quad (6)$$

The equations 5 and 6 contain no quadrature distortion components and describe the same signal as would be obtained by passing the low frequency I and Q color difference signals through a low pass filter having a characteristic, $H(\omega)$, described by the equation:

$$H(\omega) = \tfrac{1}{2}(1 - (\omega/\omega_m)^2). \quad (7)$$

Peaking filters can be inserted in the system to process these two signals to compensate for the low pass filter roll-off, yielding signals that are good approximations of the low frequency components of the original modulating I and Q color difference signals.

It is noted that the amplitude of each of the derived color difference signals is one-half the level of the original modulating signal. This reduction in amplitude simplifies the recovery of a wide bandwidth I signal having a relatively uniform range of amplitude values over its frequency spectrum. By placing a high pas filter in parallel with the low pass filter described above, the high frequency I signal components can be extracted from the signal represented by equation 2. When these components are added to the derived low frequency I signal components, a composite I color difference signal is obtained having a nearly uniform range of amplitude values over its frequency spectrum. The frequencies close to 500 KHz have different ranges of amplitude values since the peaking filter cannot completely compensate for the roll-off in this range of frequencies of the signal represented by equation 6.

The mathematical model described above is closely approximated by the apparatus described below. This embodiment of the invention is in the context of a digital television receiver. It is understood, however, that the invention may also be practiced in any video signal processing system, analog or digital, in which it is desirable to demodulate quadrature modulated signals.

In the drawings, broad arrows represent busses for multiple-bit parallel digital signals. Line arrows represent connections carrying analog signals or single-bit digital signals.

In FIG. 1, radio frequency (RF) composite television signals are received by tuner 10 through antenna 8. Tuner 10 converts the RF signals to intermediate frequency (IF) signals which are applied to IF amplifier 12. There are two paths through IF amplifier 12, one for sound and one for video. The modulated intermediate frequency sound signals are provided at terminal MS. These signals are applied to sound signal processor 14 where they may be demodulated and amplified to produce sound signals at terminal S for application to, for example, a loudspeaker (not shown).

The video intermediate frequency signals provided by IF amplifier 12 at terminal MV have a frequency spectrum similar to that shown in FIG. 2. The part of the frequency spectrum incorporating the double-sideband modulated portions of the I and Q color difference signals is between points A and B. This part exhibits, for example, an approximately linear roll-off that is oddly symmetric about the frequency of the suppressed chrominance subcarrier signal. The low frequency transition band in the frequency characteristic of the IF amplifier produces this linear, symmetric roll-off and, as set forth above, induces quadrature distortion between the two color difference signals.

The video IF signals at terminal MV are applied to video detector 16 where they are demodulated into baseband video signals. The signals provided by detector 16 are sampled at a rate equal to four times the chrominance subcarrier frequency ($4f_{sc}$) and converted into digital values by analog to digital (A/D) converter 18. These digital samples are applied to luminance-chrominance separation filter 20, the outputs of which are samples representing the luminance components of the composite video signal on bus Y and samples representing the chrominance components on bus C.

The luminance samples are applied to luminance processor 22 where they may be filtered for noise reduction and peaked to compensate for attenuation of high frequency components. These processed luminance samples are applied to digital matrix 24 where they are combined with processed color difference samples to produce samples on busses R, G and B, representing the three primary color signals red, green and blue respectively.

Chrominance samples on bus C are applied to complex demodulator 26. The samples on bus C are a sequence of alternating I and Q samples representing, respectively, the I and Q color difference signals. The sequence may be represented as, ... +I, +Q, −I, −Q, +I ... where the signs of the samples represent their sampling phase, not their polarity. Complex demodulator 26 reverses the polarity of the negative phase samples (i.e. −I and −Q) and passes the positive phase samples unchanged. The samples provided by complex demodulator 26, therefore, are alternating I and Q samples wherein all of the I samples appear to have been sampled at the same phase value as do all of the Q samples.

These samples are applied to low pass filter 28. Filter 28 may be a finite impulse response (FIR) filter which provides alternating low pass filtered I and Q samples. The samples from filter 28 are applied to the signal processing network 30 which removes a substantial portion of the quadrature distortion components induced by the IF amplifier 12. Network 30 includes three stage shift register 32, multipliers 34 and 36, coefficient sources 38 and 40, multiplexers 42 and 44, frequency divider 46 and summer 48. Samples from filter 28 are applied to shift register 32 at the system clock rate of four times the chrominance subcarrier frequency ($4f_{sc}$). At any given time, the sample in the center stage of the shift register represents one of the color difference signals and the samples in the two outside stages represent the other color difference signal. Assume that the sample in the center stage is an I sample and the saples in the outer stages are Q samples. The Q sample in the first stage of register 32 is applied to multiplier 34 and the Q sample in the third stage is applied to multiplier 36. Multiplier 34 weights the applied Q sample by a coefficient value supplied by multiplexer 42. Similarly, multiplier 36 weights the Q sample from the third stage by the coefficient value from multiplexer 44.

The scaled Q samples from multipliers 34 and 36 and the I sample from the second stage of shift register 32 are all applied to summer 48. Summer 48 produces samples $I_R$ defined by the equation:

$$I_R = I_n - A(Q_n - Q_{n+1}) \tag{8}$$

where $Q_{n+1}$ and $Q_n$ are the samples in the first and third stages of the shift register 32 respectively representing successive sample values of the signal described by equation 4, and A is the magnitude of the weighting coefficients. In the present embodiment, A has a value approximating $f_{sc}(\pi f m)$. Since the difference between successive Q samples approximates the first derivative of the Q color difference signal the samples $I_R$ approximate the signal described by equation 6 when equation 3 is substituted for $I_n$.

During alternate states, when consecutive I samples, $I_{n+1}$ and $I_n$, are in the first and third stages respectively of the shift register 32 and a Q sample, $Q_n$, is in the second stage, divider 46 controls multiplexers 42 and 44 so that the coefficient +A is applied to multiplier 34 and the coefficient −A is applied to multiplier 36. The scaled I samples and the Q samples are all applied to summer 48 which produces samples, $Q_R$, defined by the equation $$Q_R = Q_n + A(I_n - I_{n+1}).$$

This equation approximates the signal described by equation 5 above when equation 4 is substituted for $Q_n$.

The coefficient values applied to multiplexers 34 and 36 alternate between +A and −A. For Q samples in the first and third stages of shift register 32, −A is applied to multiplier 34 and +A to muliplier 36. When I samples are in the first and third stages +A is applied to multiplier 34 and −A to multiplier 36. This change in sign of the coefficients is to account for the difference in sign of the last terms of equations 3 and 4.

The coefficients are provided by sources 38 and 40 and applied to multiplexers 42 and 44. Multiplexers 42 and 44 are switched under the control of circuit 46. Circuit 46 is a divide by two frequency divider to which the $4f_{sc}$ system clock is applied. Complementary signals Q and $\overline{Q}$, occurring at a $2f_{sc}$ rate are produced by circuit 46 and applied to the control inputs of multiplexers 42 and 44.

The alternating I and Q samples provided by summer 48 represent I and Q signals having the frequency spectrum exhibited by curve 100 of FIG. 3. These samples are applied to peaking filter 50 which has a frequency characteristic similar to the one shown by curve 102 of FIG. 3. Filter 50 compensates for the high frequency roll-off of the frequency spectrum shown in curve 100 and produces I and Q samples having frequency spectra similar to that shown in FIG. 4A.

The interleaved I and Q samples from filter 50 are separated into a sequence of I samples and a sequence of Q samples by demultiplexer 52. Demultiplexer 52 is clocked by circuit 46 at one-half of the sample rate to divide alternate samples between its two output ports. I samples occurring at a $2f_{sc}$ rate are provided at one output port and Q samples at the same rate are provided at the other output port.

The I samples are applied to the first input of adder 56 to be combined with samples representing the high frequency components of the I signal. These high frequency component samples are generated by subtracter 58. All-pass demodulated output signals from complex demodulator 26 are applied through delay element 57, to the minuend input and the corresponding low pass filtered output samples from filter 28 are applied to the subtrahend input of subtracter 58. The samples provided by subtracter 58 are high frequency components of the I samples interleaved with high frequency quadrature distortion components, $\hat{I}_H$, from the Q samples.

These samples are applied to decimating element 60 which removes every other sample representing the high frequency quadrature distortion components, $\hat{I}_H$. The eliminated samples are replaced by the immediately preceeding high frequency I samples. Decimating element 60, therefore, provides samples at its output which represent the high frequency components of the I signal at an effective $2f_{sc}$ rate. These samples are applied to the second input of adder 56 which combines them with the low frequency component I samples from demultiplexer 52. Decimating element 60 in its simplest form may be, for example, a latch clocked at one-half of the system clock rate.

Figure 4A:
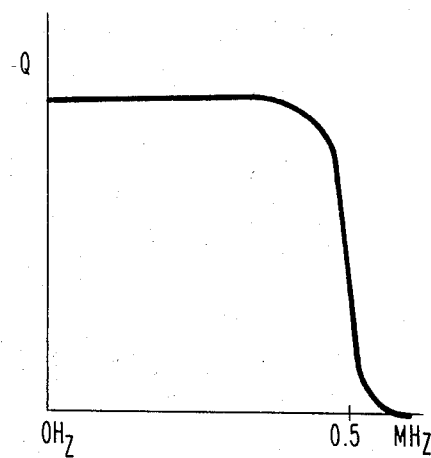
FIGS. 4A and 4B are graphs of amplitude versus frequency which illustrate the frequency spectra of the color difference signals produced by the system shown in FIG. 1.
Figure 4B:
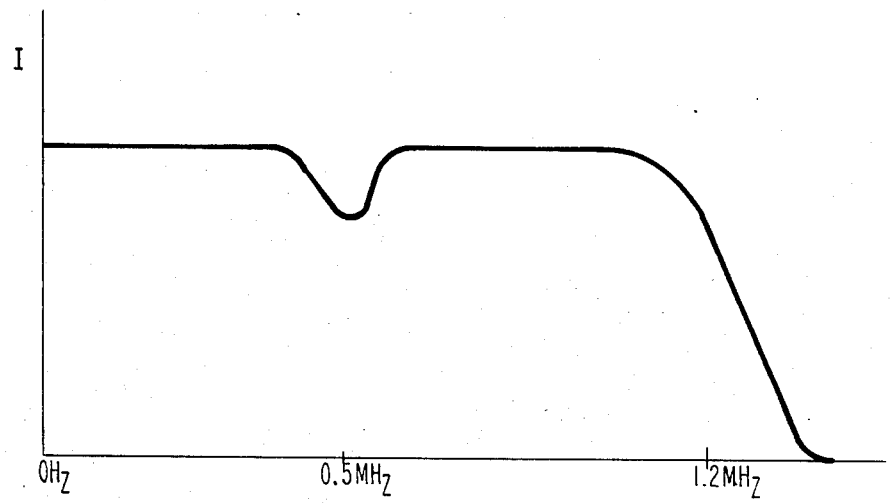

The samples provided by adder 56 represent full bandwidth I color difference signals having a frequency spectrum similar to the one shown in FIG. 4B. As explained above in reference to the mathematical model, the dip in the amplitude range of the frequency spectrum close to 500 KHz occurs because the peaking filter 50 is unable to completely compensate for the roll-off in the low frequency I signal caused by the combination of filters 12 and 28.

The I signal from adder 56 is applied to I signal processor 62 via bus I where it may, for example, be filtered for noise reduction and subject to autoflesh correction. Output signals from processor 62 are applied to one of the color difference signal input ports of matrix 24.

Q color difference signals from demultiplexer 52 are applied to Q signal processor 64 where they may be filtered to reduce their noise components and processed for autoflesh correction. The output signals of processor 64 are applied to the other color difference signal input of digital matrix 24 to be combined with the luminance and I signals, as described above, to produce red, green and blue primary color samples.

The embodiment described above is particularly advantageous because it operates on interleaved I and Q samples. For example, signal processing network 32 differentiates both the I and Q signals, subtracts the differentiated I signal from the Q signal and subtracts the differentiated Q signal from the I signal using a simple three tap FIR filter. This is not the only contemplated embodiment of the invention, however.

Figure 5:
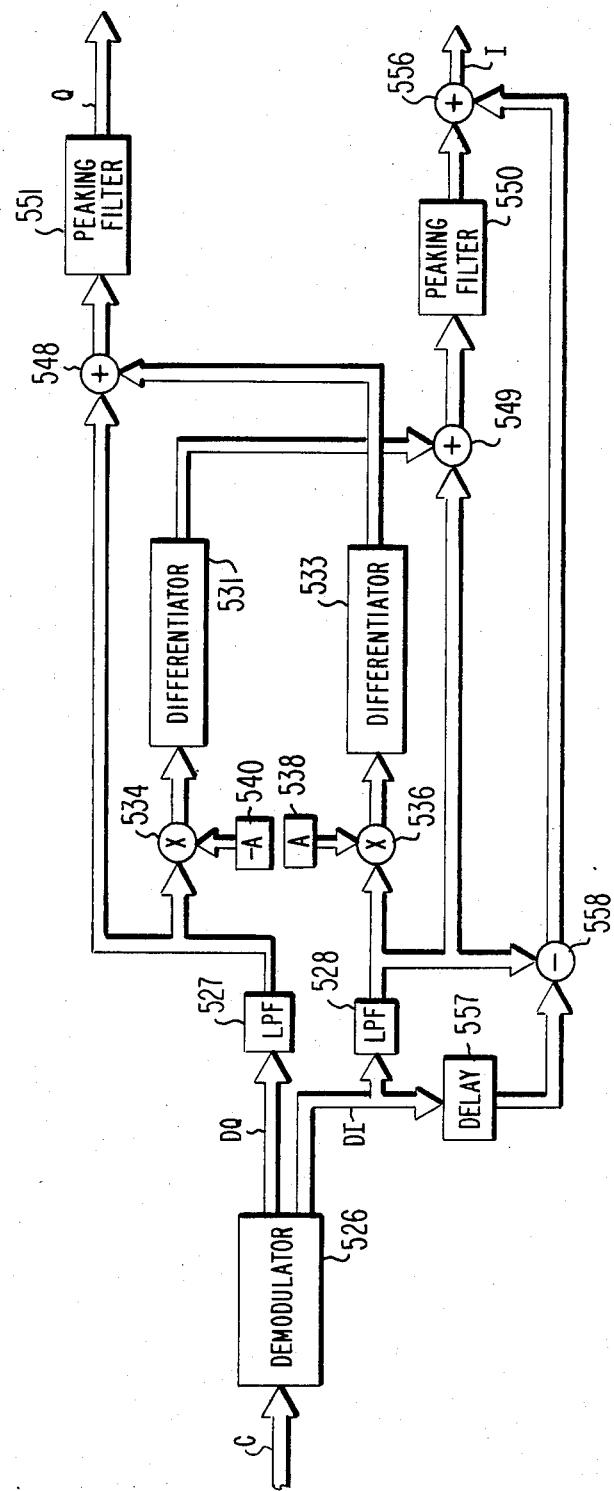
FIG. 5 is a block diagram of an alternative embodiment of part of the system shown in FIG. 1.

FIG. 5 shows an alternate embodiment of a portion of the invention in which complex demodulator 26 is replaced by a demodulator 526. Demodulator 526 converts the sequence of alternating I and Q samples from bus C into separate sequences of I and Q samples which are available at the two output ports of the demodulator. The Q samples from demodulator 526 are applied to low pass filter 527 via bus DQ. Filter 527 removes the high frequency quadrature distortion components of the Q samples, $\hat{I}_H$, and provides input samples to multiplier 534. Multiplier 534 scales these samples by the coefficient value, −A, from coefficient source 540 (this coefficient value may be the same as the one provided by source 40 of FIG. 1). Samples from multiplier 534 are applied to differentiator 531 which provides samples that approximate the first derivative of the Q signal multiplied by the coefficient value −A. These samples are added to low pass filtered I samples from low pass filter 528 in adder 549 to correct the I samples for quadrature distortion induced by the IF amplifier.

Low pass filter 528 having I samples from demodulator 526 applied via bus DI exhibits a frequency response similar to low pass filter 527. Adder 549 produes samples that represent low frequency I signals which have been corrected for Q signal quadrature distortion; these are the signals described by equation 6 above.

Samples from low pass filter 528 are also applied to multiplier 536 which scales the samples by a coefficient A from coefficient source 538 (this coefficient value may be the same as the one provided by source 38 of FIG. 1). These scaled samples are applied to differentiator 533 which provides samples to adder 548 that represent the first derivative of the low frequency I signals, $I_L$, multiplied by the coefficient A. The other input to adder 548 is the sequence of Q samples from low pass filter 527. The samples provided by adder 548 represent the corrected Q color difference signals described by equation 5 above. These samples are applied to peaking filter 551 performs the same function as filter 50 of FIG. 1 but acts only upon the Q samples. Output samples from peaking filter 551 represent Q color difference signals having a frequency spectrum similar to the one shown in FIG. 4A.

The I color difference samples from adder 549 are applied to peaking filter 550 which provides I samples, having a frequency spectrum similar to that shown in FIG. 4A. These I samples are applied to one input port of adder 556. High frequency I samples from subtracter 558 are applied to the second input port of adder 556. These high frequency samples are generated, by subtracting in subtracter 558, low pass filtered I samples from filter 528, from corresponding all-pass I samples from demodulator 526. The all-pass samples from demodulator 526 are delayed by delay element 557 to compensate for delays incurred by the low pass filter 528, before being applied to subtracter 558. The samples provided by subtracter 558 represent the high frequency components of the I color difference signals. The samples provided by adder 556 represent I color difference signals having a frequency spectrum similar to the one shown in FIG. 4B.

The signal processing paths for the luminance, I and Q samples may have different processing delays. It may, therefore, be necessary to include compensating delays in as many as two of these three signal processing paths.

The frequency characteristic described above for IF amplifier 12 is not the only one contemplated in the present invention, nor is the IF amplifier the only facility contemplated for filtering the composite video signals. For example, a filter having a transition band in its frequency characteristic that is nonlinear but still symmetric about the chrominance subcarrier is considered within the scope of the present invention. With such a filter it would be desirable to use a signal processing network 30 that removes the quadrature distortion components induced by the nonlinear transition band.

An alternative to filtering the composite television signals in the IF amplifier would be to place a filter after the video detector. Such a filter would have a similar characteristic to those described above, but would filter baseband composite television signals instead of intermediate frequency television signals.

It is further contemplated that the system described above can be used to recover the U and V color difference signals as a part of a phase alternate line (PAL) television signal processing system. PAL television signals have quadrature modulated color difference signals and a sound signal that can combine to produce interference in the luminance signal. Although quadrature distortion is less visible in the PAL system, it is believed that a PAL signal processing system would be improved by incorporating the invention described herein.

Furthermore, the signal processing system 30 could be simplified by removing multiplexers 42 and 44 and frequency divider 46 and by connecting coefficient sources 38 and 40 directly to multipliers 34 and 36 respectively. These same changes would also apply if equiband I and Q or (R-Y) and (B-Y) color difference signals were desired in an NTSC environment. For the above to be effective, of course, the demodulating functions of complex demodulator 28 would be included in the color difference signal processors 62 and 64 of FIG. 1.

What is claimed is:

1. In a video signal processing system for processing signals having chrominance signal components including first and second color difference signal components that modulate a suppressed carrier signal in quadrature, wherein said first color difference signal includes quadrature distortion signal components related to said second color difference signal and said second color difference signal includes quadrature distortion signal components related to said first color difference signal, said chrominance signal components being in sampled data format and occurring in a sequence of alternating first and second color difference signal samples, apparatus for reducing said quadrature distortion comprising:
cascaded delay elements having initial and final stages for providing samples representative of one of said color difference signals and an intermediate stage for providing samples representative of the other one of said color difference signals; and
sample combining means couled to said cascaded delay elements for developing samples proportional to the difference in magnitude between the samples from said initial and final stages and for combining said developed samples and the samples from said intermediate stage to substantially cancel the quadrature distortion signal components included in the samples from said intermediate stage.

2. A video signal processing system in accordance with claim 1, also including a first multiplier, interposed between said inital stage of said cascaded delay elements and said sample combining means; a second multiplier, interposed between said final stage of of said cascaded delay elements and said sample combining means; means for utilizing said first multiplier to subject the samples delivered from said initial stage to said sample combining means to multiplication by a predetermined positive coefficient during alternate sampling intervals and by a predetermined negative coefficient during the intervening sampling intervals; and means for utilizing said second multiplier to subject the samples delivered from said final stage to said sample combining means to multiplication by said predetermined negative coefficient during said alternate sampling intervals and by said predetermined positive coefficient during said intervening sampling intervals.

3. A video signal processing system in accordance with claim 2 also including a peaking filter responsive to the output of said sampling combining means for increasing the amplitude of the high frequency components relative to the low frequency components of said output of said signal combining means, and demultiplexing means responsive to the output of said peaking filter for separating the samples representing said first color difference signal from the samples representing said second color difference signal and for providing said separated samples at respective output ports.

4. A video signal processing system in accordance with claim 3 wherein the bandwidth of said first color difference signal exceeds the bandwidth of said second color difference signal, and wherein chrominance signal components supplied to said cascaded delay elements are confined in frequency to the band of frequencies shared by said first and second color difference signals; said system also including signal combining means, coupled to the output port of said demultiplexing means at which samples representing said first color difference signal are provided, for combining said provided samples with samples representative of components of said first color difference signal having frequencies lying outside said shared band.

5. In a video signal processing system for processing intermediate frequency television signals having I and Q color difference signals modulating a suppressed carrier signal in quadrature to produce two I signal sidebands and two Q signal sidebands, wherein said Q signal sidebands and one of said I signal sidebands occupy frequency bands that are substantially equal in width and the other one of said I signal sidebands occupies a frequency band that is wider than said other sidebands, apparatus comprising:

filtering means responsive to said intermediate frequency television signals and having a frequency characteristic with a transition band that is substantially linear, substantially within the band of frequencies occupied by said two Q signal sidebands, and substantially oddly symmetric about the frequency of said chrominance carrier signal, and wherein said filtering means tends to induce quadrature distortion in said I and Q color difference signal components of said television signal proportional to the first derivatives of said Q and I color difference signal components respectively;

a video detector for deriving baseband video signals from the intermediate frequency television signals provided by said filtering means;

an analog to digital converter coupled to said video detector for providing samples representative of said baseband video signal at a rate substantially equal to four times the frequency of said chrominance carrier;

signal isolating means responsive to said baseband video samples for providing chrominance samples representative of said chrominance signal components to the substantial exclusion of the other components of said baseband video samples;

complex demodulating means, responsive to said chrominance samples for providing alternating I and Q samples, said I samples being representative of said I color difference signals and said Q samples being representative of said Q color difference signals;

low pass filtering means coupled to said demodulating means for providing low pass filtered I and Q samples occupying frequency bands substantially equal in width to one of said Q signal sidebands;

signal processing means responsive to said low pass filtered I and Q samples for developing correction samples representative of the quadrature distortion components of said Q and I signals respectively;

sample combining means responsive to said low pass filtered I samples for subtracting therefrom said correction samples developed from said low pass filtered Q samples and responsive to low pass filtered Q samples for adding thereto said correction signal developed from said low pass filtered I samples;

a high pass filter coupled to said demodulating means for providing samples representing I color difference signals occupying a band of frequencies substantially greater than the band of frequencies occupied by the I samples provided by said low pass filter; and sample summing means for combining the I samples from said signal processing means and the samples from said high pass filter to provide samples representing I color difference signals having a substantially uniform range of amplitude values over a band of frequencies substantially equal in width to said wider I signal sideband.

6. The apparatus set forth in claim 5 wherein the signal processing means comprises:

cascaded delay elements coupled to said low-pass filtering means having initial and final stages for providing samples representative of one of said color difference signals and an intermediate stage for providing samples representative of the other one of said color difference signals; and sampling combining means coupled to said cascaded delay elements for developing samples proportional to the difference between samples from said initial and final stages.

7. The apparatus set forth in claim 6 wherein said signal processing means further comprises:

a peaking filter coupled to said signal processing means for increasing the amplitude of the high frequency components relative to the low frequency components of the samples provided by said signal processing means;

demultiplexing means coupled to said peaking filter for separating the samples representing said I color difference signal from the samples representing said Q color difference signal and for providing said separated samples at respective output ports; and means coupling said I color difference samples to said sample summing means.

* * * * *